United States Patent
Koudo et al.

(10) Patent No.: US 9,267,849 B2
(45) Date of Patent: Feb. 23, 2016

(54) DISPLAY DEVICE WITH TEMPERATURE SENSOR

(71) Applicant: Panasonic Liquid Crystal Display Co., Ltd., Himeji-shi, Hyogo (JP)

(72) Inventors: Toshikazu Koudo, Hyogo (JP); Hidefumi Ishibashi, Osaka (JP); Masaaki Kitajima, Chiba (JP); Masato Ishii, Tokyo (JP); Masahiro Ishii, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 278 days.

(21) Appl. No.: 13/754,399

(22) Filed: Jan. 30, 2013

(65) Prior Publication Data

US 2013/0195141 A1  Aug. 1, 2013

(30) Foreign Application Priority Data

Feb. 1, 2012  (JP) .................................. 2012-019589

(51) Int. Cl.
*G01K 1/00* (2006.01)
*G01K 7/00* (2006.01)
*G01K 7/42* (2006.01)

(52) U.S. Cl.
CPC ... *G01K 7/00* (2013.01); *G01K 7/42* (2013.01)

(58) Field of Classification Search
USPC .................................................. 374/141, 163
See application file for complete search history.

(56) References Cited

U.S. PATENT DOCUMENTS

| | | | | |
|---|---|---|---|---|
| 6,115,091 A * | 9/2000 | Kondoh et al. | .................. | 349/72 |
| 6,309,100 B1 * | 10/2001 | Lutnaes | .................. | 374/183 |
| 7,315,343 B2 * | 1/2008 | Takeoka | .................. | 349/161 |
| 7,333,159 B2 * | 2/2008 | Lee et al. | .................. | 349/21 |
| 7,554,627 B2 * | 6/2009 | You et al. | .................. | 349/72 |
| 8,702,307 B2 * | 4/2014 | Bartholmae | .................. | 374/183 |
| 2004/0125853 A1 * | 7/2004 | Yu | .................. | 374/141 |
| 2005/0285994 A1 * | 12/2005 | Park et al. | .................. | 349/72 |
| 2010/0033654 A1 * | 2/2010 | Aoki | .................. | 349/72 |
| 2010/0061423 A1 * | 3/2010 | Bartholmae | .................. | 374/185 |
| 2010/0194675 A1 * | 8/2010 | Yoshida et al. | .................. | 345/102 |
| 2010/0245721 A1 * | 9/2010 | Chang et al. | .................. | 349/72 |
| 2012/0087389 A1 * | 4/2012 | Howe et al. | .................. | 374/142 |
| 2012/0229733 A1 * | 9/2012 | Ishii et al. | .................. | 349/72 |
| 2013/0057808 A1 * | 3/2013 | Mizusako et al. | .................. | 349/72 |
| 2013/0223475 A1 * | 8/2013 | Yoon et al. | .................. | 374/57 |
| 2014/0354185 A1 * | 12/2014 | Yoshida | .................. | 315/309 |

FOREIGN PATENT DOCUMENTS

| | | |
|---|---|---|
| JP | 2000-089197 | 3/2000 |
| JP | 2007-093939 | 4/2007 |

OTHER PUBLICATIONS

Translation of JP 2007093939 (Apr. 12, 2007).*

* cited by examiner

*Primary Examiner* — Mirellys Jagan
(74) *Attorney, Agent, or Firm* — Hamre, Schumann, Mueller & Larson, P.C.

(57) ABSTRACT

A display device includes a temperature sensor which is arranged in the inside of a housing, and a control unit which calculates a temperature of a display panel based on an output value of the temperature sensor. The control unit calculates the temperature of the display panel based on a current output value of the temperature sensor and an output value of the temperature sensor received prior to the receiving of the current output value. With such a display device, the temperature of the display panel can be calculated with high accuracy even when a temperature of a device which constitutes a heat source is changed.

6 Claims, 10 Drawing Sheets

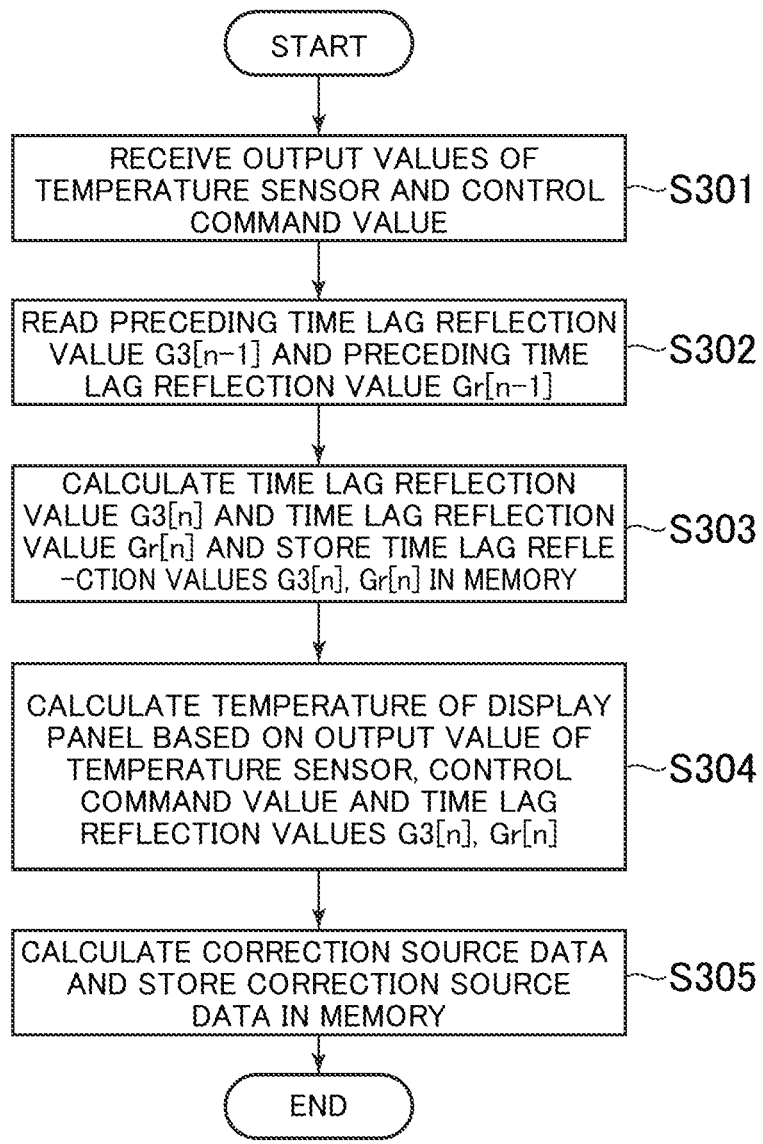

DISPLAY DEVICE WITH TEMPERATURE SENSOR

CROSS-REFERENCE TO RELATED APPLICATION

The present application claims priority from Japanese application JP2012-019589 filed on Feb. 1, 2012, the content of which is hereby incorporated by reference into this application.

BACKGROUND OF THE INVENTION

1. Field of the Invention

The present invention relates to a display device which estimates a temperature of a display panel using a temperature sensor, and more particularly to a technique for enhancing the accuracy of temperature estimation.

2. Description of the Related Art

Various devices which constitute heat sources such as a backlight unit, a power source circuit and a drive circuit for a liquid crystal display panel are arranged in the inside of a housing of a liquid crystal display device. The operation of liquid crystal is affected by heat generated from the heat sources. Conventionally, there has been known a liquid crystal display device where a temperature sensor is arranged in the inside of a housing, and a temperature of a liquid crystal display panel is calculated based on a temperature detected by the temperature sensor (see JP 2000-89197 A and JP 2007-93939 A, for example). In these liquid crystal display devices, a gray scale value is corrected based on a temperature of the liquid crystal display panel.

A temperature of the above-mentioned device which constitutes the heat source is changed corresponding to a drive state of the liquid crystal display device. For example, there has been known a liquid crystal display device which has a high brightness mode and a low brightness mode as an operation mode of a backlight unit. In such a liquid crystal display device, when the operation mode is switched to the low brightness mode from the high brightness mode, for example, a temperature of the backlight unit is gradually lowered. However, since it is difficult to mount the temperature sensor on a liquid crystal display panel per se, it is often the case that the temperature sensor is disposed away from the liquid crystal display panel. Accordingly, although a temperature of the liquid crystal display panel and an output value of the temperature sensor are changed in accordance with a change in temperature of a heat source, there exists a time lag between a change in temperature of the liquid crystal display panel and a change in output value of the temperature sensor. Accordingly, when a temperature of the heat source is changed, an difference between a temperature of the liquid crystal display panel calculated using the temperature sensor and an actual temperature of the liquid crystal display panel is increased due to the above-mentioned time lag.

SUMMARY OF THE INVENTION

An aspect of the present invention provide a display device capable of decreasing an difference between a temperature of a display panel calculated using a temperature sensor and an actual temperature of the display panel.

A display device to overcome the above-mentioned drawbacks includes: a display panel; a housing which houses the display panel and a heat source device which is a heat source in the display device when the display panel is driven; a temperature sensor arranged in the inside of the housing; and a control unit which calculates a temperature of the display panel based on an output value of the temperature sensor. The control unit calculates the temperature of the display panel based on a current output value of the temperature sensor and an output value of the temperature sensor received prior to the receiving of the current output value.

According to the above-mentioned display device, the temperature of the display panel can be calculated with high accuracy even when a temperature of the device which constitutes the heat source is changed.

BRIEF DESCRIPTION OF THE DRAWINGS

FIG. 10 is a flowchart showing an example of processing which the control unit of the third example executes.

DETAILED DESCRIPTION OF THE INVENTION

Figure 1:
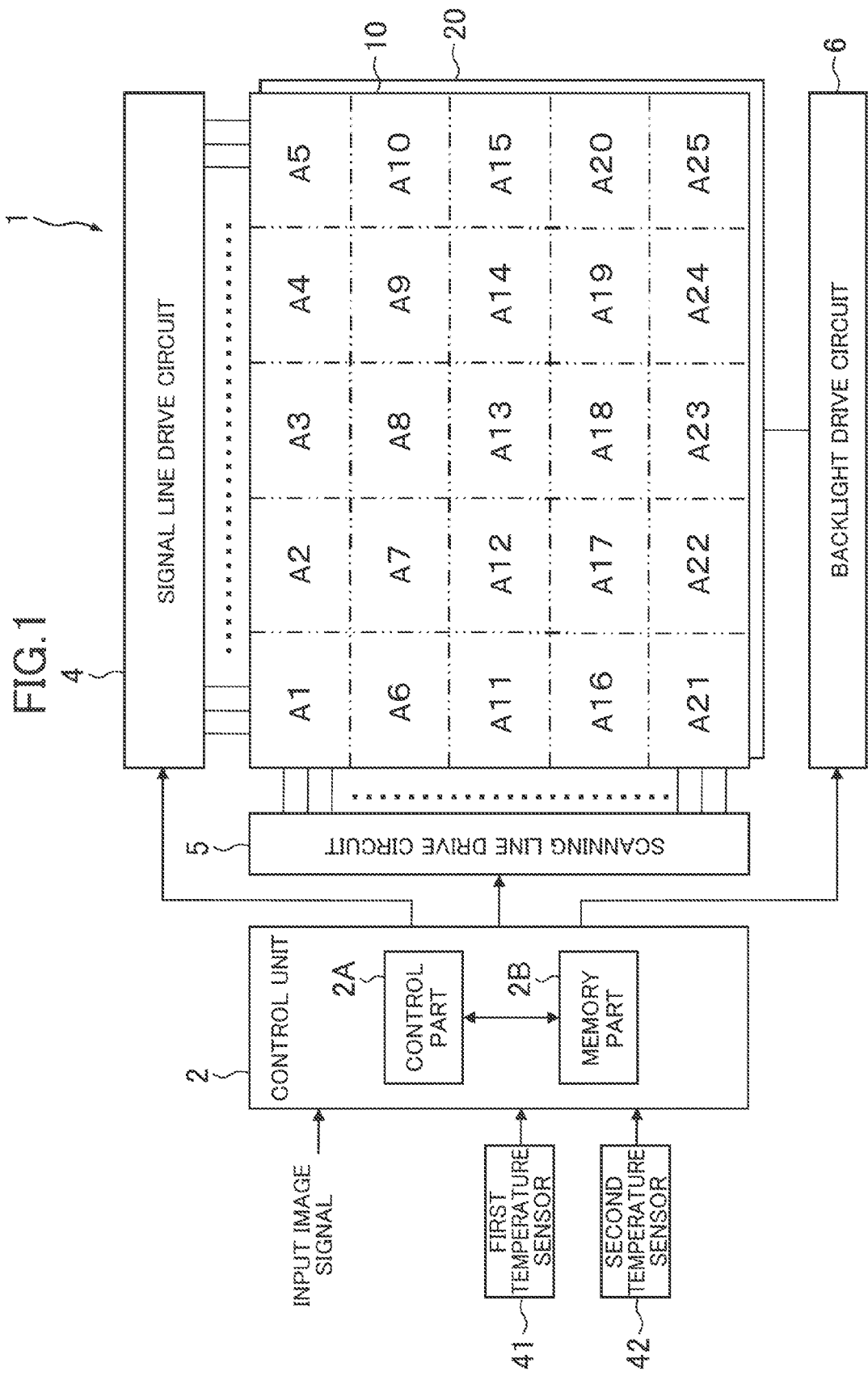
FIG. 1 is a view showing the schematic constitution of a display device according to one embodiment of the present invention.
Figure 2:
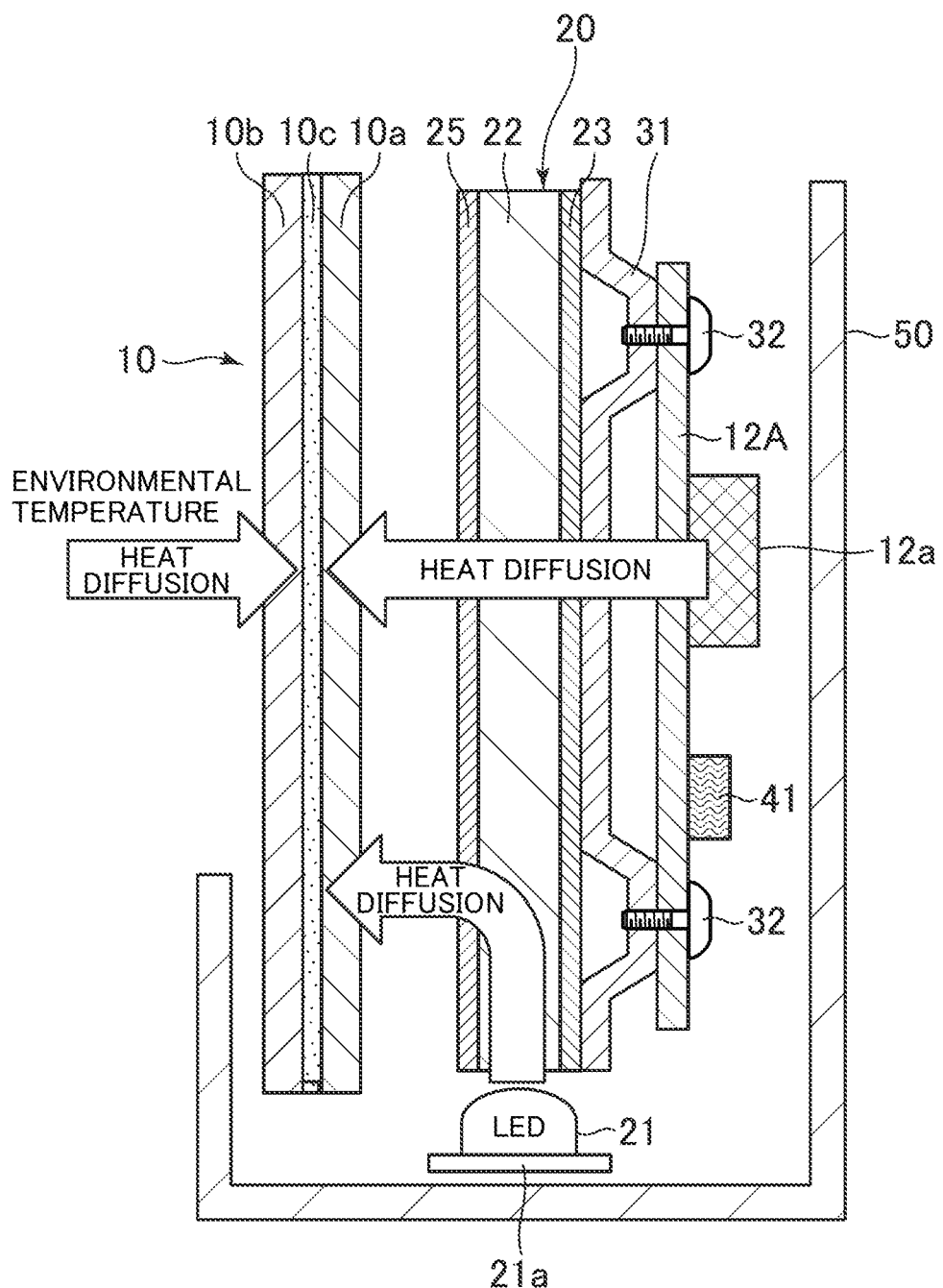
FIG. 2 is a schematic view showing a cross section of the display device.
Figure 3:
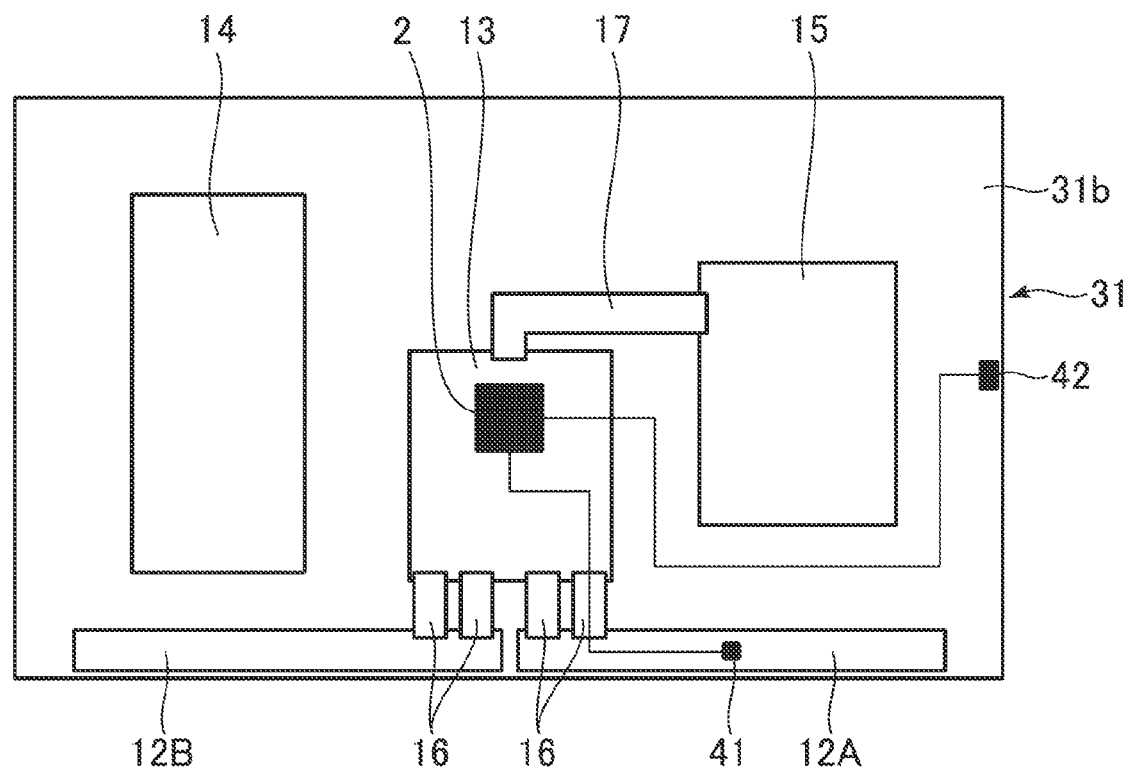
FIG. 3 is a view for explaining a position of a temperature sensor, wherein a rear frame which covers a back surface of a display panel and a back surface of a backlight unit is schematically shown.

Hereinafter, an embodiment of the present invention will be explained in conjunction with drawings. FIG. 1 is a view showing the schematic constitution of a display device 1 according to the embodiment of the present invention. FIG. 2 is a schematic view showing a cross section of the display device 1. FIG. 3 is a view for explaining positions of temperature sensors 41, 42 described later, wherein a rear frame 31 which covers a back surface of a display panel 10 and a back surface of a backlight unit 20 is schematically shown.

As shown in FIG. 1 and FIG. 2, the display device 1 includes the display panel 10. The display panel 10 is a liquid crystal display panel, and includes a pair of transparent substrates (for example, glass substrates) 10a, 10b facing each other, and a liquid crystal layer 10c formed between the transparent substrates 10a, 10b. The transparent substrate 10a is employed as a TFT (Thin Film Transistor) substrate, and the transparent substrate 10b is employed as a color filter substrate.

The display device 1 includes the backlight unit 20 which irradiates light to the back surface of the display panel 10. The backlight unit 20 used in this embodiment includes, as shown in FIG. 2, a light guide plate 22 of a size corresponding to a size of the display panel 10, and a plurality of LEDs (Light Emitting Diodes) 21 which are arranged along edges (for example, an upper edge and a lower edge) of the light guide plate 22. The LEDs 21 are mounted on a circuit board 21a arranged along the edge of the light guide plate 22. The backlight unit 20 includes a reflection plate 23 arranged on a back surface of the light guide plate 22 to reflect light emitted from the LEDs 21 toward the display panel 10. An optical sheet 25 such as a diffusion sheet or a prism sheet is arranged on a front surface of the light guide plate 22. A light source of the backlight unit 20 is not limited to the LEDs. For example, the light source may be formed of a cold cathode tube. The position where the light source such as the LEDs 21 or the cold cathode tube is mounted is not limited to the edge of the light guide plate 22. For example, the LEDs 21 may be arranged on a back side of the display panel 10 in a matrix array. The LEDs 21 may be arranged only on a center portion of the backlight unit 20 in the vertical direction or only on a center portion of the backlight unit 20 in the lateral direction. A kind of display panel 10 is not limited to the liquid crystal display panel. For example, the display panel 10 may be formed of an organic EL panel. In this case, the display panel 10 is not provided with the backlight unit 20.

As shown in FIG. 1, the display device 1 includes a control unit 2, a signal line drive circuit 4, a scanning line drive circuit 5 and a backlight drive circuit 6.

The display device 1 is a device which functions as a television receiver set, for example. The control unit 2 receives an input image signal which is provided by a tuner or an antenna (not shown in the drawing) included in the television receiver set, and an input image signal which an external device such as an image reproducing device generates. The control unit 2 includes a control part 2A having a microprocessor, and executes a program stored in a memory 2B which is constituted of a ROM (Read Only Memory), a RAM (Random Access Memory) and the like. The control unit 2 generates output image signals indicative of gray scale values of respective pixels formed on the display panel 10, based on the input image signal, and outputs the output image signals to the signal line drive circuit 4. Further, the control unit 2 generates a timing signal for synchronizing the signal line drive circuit 4 and the scanning line drive circuit 5, based on the input image signal, and outputs the timing signal to the respective drive circuits.

The first temperature sensor 41 and the second temperature sensor 42 described later are connected to the control unit 2. The control unit 2 estimates a temperature of the display panel 10 based on output values of the temperature sensors 41, 42. The temperature estimation processing executed by the control unit 2 will be explained in detail later.

The scanning line drive circuit 5 is connected to scanning lines formed on the TFT substrate 10a, and sequentially applies a gate voltage to the plurality of scanning lines in response to the timing signal inputted from the control unit 2.

The signal line drive circuit 4 is connected to signal lines formed on the TFT substrate 10a, and applies voltages corresponding to the output image signals from the control unit 2, that is, voltages corresponding to the gray scale values of the respective pixels to the signal lines in response to a timing at which the gate voltage is applied.

The backlight drive circuit 6 supplies drive power to the LEDs 21 based on the signal inputted from the control unit 2. The control unit 2 has, as a control mode of the backlight unit 20, a plurality of control modes which differ from each other in brightness of the LEDs 21. For example, the control unit 2 has a high brightness mode where the LEDs 21 are driven with high brightness, a low brightness mode where the LEDs 21 are driven with low brightness, and an intermediate brightness mode where the LEDs 21 are driven with approximately intermediate brightness. The backlight drive circuit 6, upon receiving a control signal which specifies the control mode from the control unit 2, supplies drive power corresponding to the control mode to the LEDs 21.

As shown in FIG. 2, the display device 1 includes the plate-shaped rear frame 31 arranged on a back side of the backlight unit 20. The light guide plate 22 and the reflection plate 23 are fixed to the rear frame 31. The rear frame 31 is formed using metal such as iron.

A plurality of circuit boards are mounted on a back surface of the rear frame 31. For example, as shown in FIG. 3, a main circuit board 13, a power source circuit board 14, an application circuit board 15, and circuit boards 12A, 12B are fixed to the rear frame 31. The control unit 2 is mounted on the main circuit board 13, for example. The application circuit board 15 has a circuit mounted thereon which functions as an interface for an external device, for example. The circuit boards 12A, 12B are source circuit boards having a circuit formed thereon for controlling the sources of TFTs, for example. The above-mentioned signal line drive circuit 4 is mounted on FPCs (Flexible printed circuits) 16, 17 which connect the circuit boards 12A, 12B with the TFT substrate 10a, for example.

The circuit boards 12A, 12B are fixed to the rear frame 31 by screws 32. A power source circuit which supplies drive power to the respective circuits in the display device is mounted on the power source circuit board 14. The above-mentioned backlight drive circuit 6 is mounted on the power source circuit board 14 and the circuit boards 12A, 12B, for example. The circuit boards 12A, 12B and the application circuit board 15 are connected to the main circuit board 13 through the FPC 16, 17.

The circuit boards 12A, 12B, the main circuit board 13, the power source circuit board 14 and the application circuit board 15 have a device (component) such as an IC chip mounted thereon which generates heat when the display device 1 is driven. In FIG. 2, an IC chip 12a mounted on the circuit board 12A is exemplified. Further, the LEDs 21 also generate heat when the display device 1 is driven. These heats are transmitted to the display panel 10. As shown in FIG. 2, the display panel 10, the backlight unit 20, the circuit boards 12A, 12B, the main circuit board 13, the power source circuit board 14 and the application circuit board 15 are housed in a housing 50.

As shown in FIG. 1 and FIG. 2, the display device 1 includes the first temperature sensor 41. The first temperature sensor 41 is used for estimating a temperature of the display panel 10. In this embodiment, the first temperature sensor 41 is mounted on the circuit board 12A. The circuit boards 12A, 12B are arranged closest to the LEDs 21 among the plurality of circuit boards in the display device 1. In this embodiment, the circuit boards 12A, 12B are fixed to a lowermost portion of the rear frame 31, and are positioned along an edge (a lower edge in this embodiment) of the backlight unit 20. Accordingly, the first temperature sensor 41 is configured to easily receive heat of the LEDs 21 arranged on the edge of the backlight unit 20. The mounting position of the first temperature sensor 41 is not limited to such a position. The first temperature sensor 41 may be mounted on the main circuit board 13, the power source circuit board 14 or the application circuit board 15, for example.

As shown in FIG. 2, the display device 1 also includes the second temperature sensor 42. The second temperature sensor 42 detects a temperature of an environment where the display device 1 is placed, and is located more distant from the device which constitutes a heat source such as an IC chip than the first temperature sensor 41 is. That is, the second temperature sensor 42 is arranged at a position where even when a temperature of the heat source is changed, the second temperature sensor 42 is substantially hardly influenced by such a change in temperature so that a value corresponding to an environmental temperature can be outputted from the second temperature sensor 42. For example, the second temperature sensor 42 is arranged in the vicinity of a ventilation hole (not shown in the drawing) formed in the housing 50. For example, the position of the second temperature sensor 42 is defined on any one of the circuit boards and is closest to the ventilation hole. Alternatively, the second temperature sensor 42 may be arranged at a position other than a position on the circuit boards 12A, 12B, main circuit board 13, power source circuit board 14 and application circuit board 15. Alternatively, the second temperature sensor 42 may be mounted on a position which is defined on any one of the circuit boards 12A, 12B, the main circuit board 13, the power source circuit board 14 and the application circuit board 15 and is most distant from the device which constitutes the heat source on the circuit board.

Processing executed by the control unit 2 will be explained. As described above, the display device 1 includes the plurality of devices (components) which constitute the heat sources in the housing 50 (the device constituting the heat source being referred to as a heat source device hereinafter). The heat source devices include a heat source device whose temperature is changed corresponding to an operation of the display device 1. For example, a temperature of the LEDs 21 is changed corresponding to the brightness of the LEDs 21. There exists a time lag between a change in temperature of the heat source device and a change in temperature of the display panel 10. That is, the temperature of the display panel 10 is changed with a delay from the change in temperature of the heat source device. In view of the above, the control unit 2 calculates (estimates) the temperature of the display panel 10 based on not only a current output value of the first temperature sensor 41 but also an output value of the first temperature sensor 41 received prior to the receiving of the current output value. Accordingly, an error in temperature estimation caused by the time lag can be decreased.

The temperature of the display panel 10 depends on not only the temperature of the heat source device but also an environmental temperature of a place where the display device 1 is placed. The temperature of the heat source device is changed corresponding to an operation of the display device 1, and is changed independently from the environmental temperature. For example, even when the environmental temperature is fixed, the temperature of the LEDs 21 is changed corresponding to a control mode of the backlight unit 20. Accordingly, it is difficult to eliminate an error when the temperature of the heat source device is changed using only the output value of the first temperature sensor 41. In view of the above, a temperature calculating section 2b of this embodiment calculates the temperature of the display panel 10 based on an output value of the second temperature sensor 42 in addition to the output value of the first temperature sensor 41. Accordingly, the temperature estimation with higher accuracy can be realized.

Figure 4:
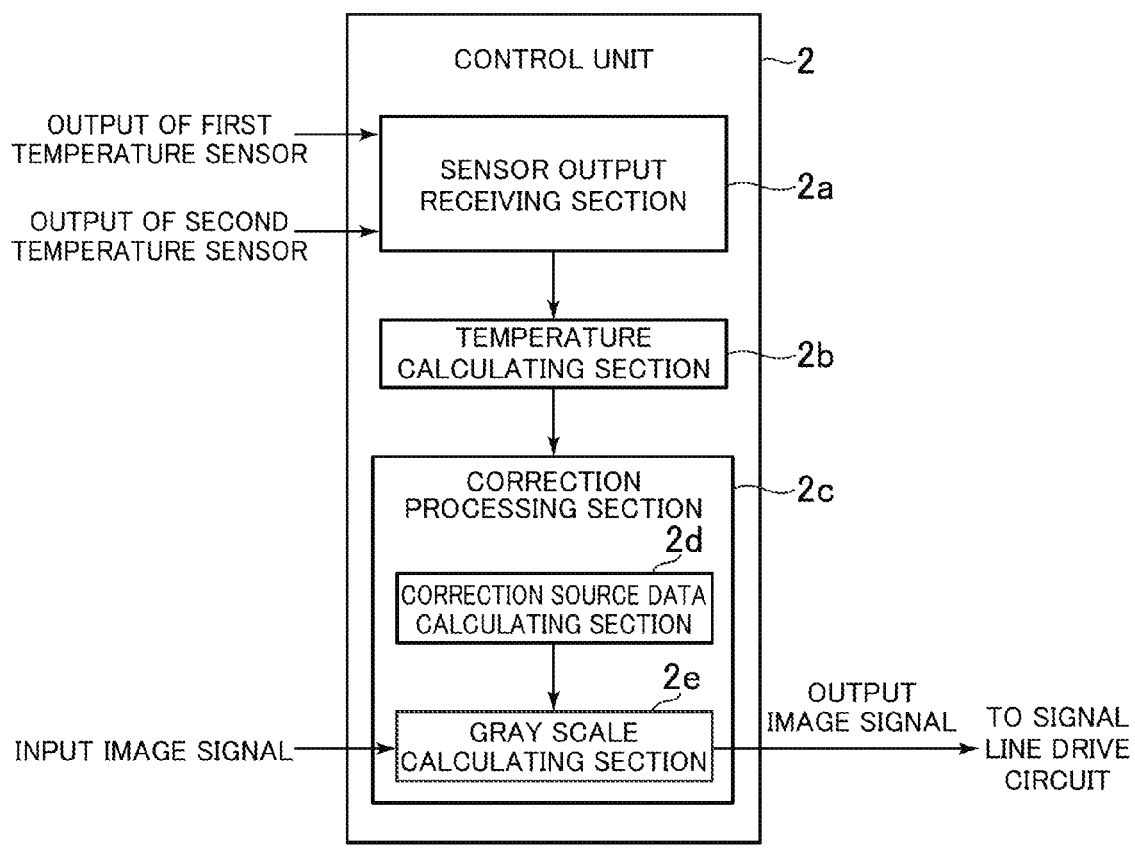
FIG. 4 is a block diagram showing functions which a control unit of the display device includes.

FIG. 4 is a block diagram showing functions of the control part 2A in the control unit 2. The control part 2A includes, as functions thereof, a sensor output receiving section 2a, the temperature calculating section 2b and a correction processing section 2c.

The sensor output receiving section 2a receives the output values of the temperature sensors 41, 42 at a preset sampling cycle. Further, the sensor output receiving section 2a may execute filter processing for eliminating noises caused by disturbance. For example, the sensor output receiving section 2a may determine whether or not a current output value is a noise based on magnitude of a change in output values (change speed) of the temperature sensors 41, 42, for example, the difference between a preceding received output value and the current output value. Then, the sensor output receiving section 2a may receive only output values which are not regarded as noises.

The temperature calculating section 2b calculates the temperature of the display panel 10 based on the output values of the temperature sensors 41, 42. The temperature calculating section 2b calculates the temperature of the display panel 10 using the following formula (1), for example.

$$Tp=F1(T1)+K\times T2 \quad \text{Formula (1)}$$

Tp: temperature of display panel 10
T1: output value of first temperature sensor 41
F1: function where output value of first temperature sensor 41 is used as variable
T2: output value of second temperature sensor 42
K: coefficient In the formula (1), T1 indicates both the current output value and the output value of the first temperature sensor 41 received prior to the receiving of the current output value. As expressed by the formula (1), the temperature of the display panel 10 is calculated using a value which is acquired by multiplying the output value of the second temperature sensor 42 by the coefficient K. The coefficient K has a tendency that the smaller a distance between the display panel 10 and the heat source device, the smaller the coefficient K becomes, for example.

The temperature calculating section 2b calculates a temperature of the display panel 10 based on a current output value of the first temperature sensor 41 and an output value of the first temperature sensor 41 received prior to the receiving of the current output value by using the function F1. The function F1 is defined so that a calculation result F1 (T1) of the function F1 follows an actual change in temperature of the display panel 10 when the temperature of the heat source device is changed. In other words, when the temperature of the heat source device is changed, a value proportional to the actual temperature of the display panel 10 can be calculated through the function F1, based on an output value of the first temperature sensor 41. According to this function F1, a time lag between a change in output value of the first temperature sensor 41 and a change in temperature of the display panel 10 can be compensated. That is, even when the change in temperature of the display panel 10 is delayed from the change in output value of the first temperature sensor 41, the current temperature of the display panel 10 can be calculated based on the output value of the first temperature sensor 41.

The function F1 is expressed by the following formula (2), for example.

$$F1(T1)=TK1\times T1[n]+TR1\times G1[n]+OFS1 \quad \text{Formula (2)}$$

T1[n]: current output value of first temperature sensor 41
G1[n]: value depending on current output value of first temperature sensor 41 and output value of first temperature sensor 41 received prior to the receiving of current output value (hereinafter referred to as time lag reflection value)
TK1, TR1: coefficients
OFS1: offset value The current output value T1[n] is the latest output value which the sensor output receiving section 2a receives, for example. The current output value T1[n] may not be always the latest output value. For example, when noises are detected by the sensor output receiving section 2a, the current output value T1[n] may be an output value received at one-time or two-time preceding sampling timing.

In the formula (2), the temperature calculating section 2b multiplies the current output value T1[n] of the first temperature sensor 41 and the time lag reflection value G1[n] based on the output value of the first temperature sensor 41 received prior to the receiving of the current output value by the coefficients TK1, TR1 respectively. The coefficient TK1 and the coefficient TR1 depend on a distance between the first temperature sensor 41 and the display panel 10, a distance between the heat source device (LEDs 21, for example) and the display panel 10, and a distance between the first temperature sensor 41 and the heat source device (the distance being a distance of a heat transfer passage). For example, when the shorter the distance between the display panel 10 and first temperature sensor 41, the larger the coefficient TK1 becomes.

The time lag reflection value G1[n] in the formula (2) is expressed by the following formula (3).

$$G1[n] = T1[n] \times (1-IR1) + G1[n-1] \times IR1 \quad \text{Formula (3)}$$

G1[n−1]: time lag reflection value acquired in one-time preceding calculation prior to calculation which uses current output value T1[n] of first temperature sensor 41

That is, G1[n−1] depends on one-time preceding output value T1[n−1] of first temperature sensor 41 and output value of first temperature sensor 41 received prior to the receiving of one-time preceding output value T1[n−1].

IR1: coefficient

The temperature calculating section 2b calculates the time lag reflection value using a function G1 expressed by the formula (3). In this embodiment, the function G1 is an infinite impulse response filter. Accordingly, a time lag reflection value received prior to the receiving of the time lag reflection value G1[n] is fed back to the time lag reflection value G1[n]. That is, the function G1 uses, as variables, a calculation result G1[n−1] acquired by the function G1 based on the output value T1[n−1] received prior to the receiving of the current output value T1[n] and the current output value T1[n]. In this embodiment, the function G1 is a first-order infinite impulse response filter which uses only the time lag reflection value G1[n−1] acquired in one-time preceding calculating. The coefficient IR1 also depends on a distance between the first temperature sensor 41 and the display panel 10, a distance between the heat source device and the display panel 10, and a distance between the first temperature sensor 41 and the heat source device.

The function G1 is not limited to the first-order infinite impulse response filter which uses the time lag reflection value G1[n−1], and may be a second-order infinite impulse response filter which uses a time lag reflection value G1[n−2] acquired in two-time preceding calculation or a third-order infinite impulse response filter which uses a time lag reflection value G1[n−3] acquired in three-time preceding calculation. By using a low-order infinite impulse response filter, a memory capacity used by the temperature calculating section 2b can be made small.

The function G1 may not be always the infinite impulse response filter. For example, the function G1 may be a finite impulse response filter. That is, the function G1 may be a function where a plurality of output values such as the current output value T1[n], the one-time preceding output value T1[n−1] and a two-time preceding output value T2[n−2] are respectively multiplied by coefficients, and the sum of these values is calculated. Further, the function F1 is not always limited to the formula (2) and may be modified in various forms so that a time lag between a change in output value of the first temperature sensor 41 and an actual change in temperature of the display panel 10 can be compensated.

A temperature of the display panel 10 differs depending on a position on the display panel 10. Accordingly, in this embodiment, the display panel 10 is partitioned into a plurality of regions Ai (i=1, 2 ... 25 in FIG. 1) in advance as shown in FIG. 1. The temperature calculating section 2b calculates temperatures of the plurality of regions respectively. That is, the above-mentioned coefficients K, TK1, TR1, IR1 and offset value OFS1 are stored in the memory 2B in a state where the coefficients and the offset value are associated with the plurality of regions respectively. The temperature calculating section 2b calculates the temperatures of the regions using the coefficients and the offset values associated with the respective regions. For example, in calculating the temperature of a region Am, the temperature calculating section 2b calculates the temperature of the region Am using coefficients Km, TK1m, TR1m, IR1m and an offset value OFS1m associated with the region Am. The forms of the formula (1) and the functions F1 and G1 are all common among all regions.

The above-mentioned plurality of regions may not be defined on the display panel 10. In this case, the coefficients K, TK1, TR1, IR1 and the offset value OFS1 may be defined so that an average temperature of the whole display panel 10 can be calculated.

The correction processing section 2c corrects various parameters which reflect on an image displayed on the display panel 10 based on the calculated temperature of the display panel 10. In this embodiment, the display panel 10 is partitioned into the plurality of regions. The correction processing section 2c calculates the parameter associated with each region, based on the temperature calculated for the region.

The parameter may be a gray scale value of each pixel, for example. That is, the correction processing section 2c corrects gray scale values of input image signals based on a temperature of the display panel 10, and outputs, as output image signals, signals corresponding to the corrected gray scale values. The correction processing section 2c corrects the gray scale value of a pixel formed in each region based on the temperature calculated for the region. Further, the parameter may be a voltage applied to a common electrode (not shown in the drawing) formed on the TFT substrate 10a or the color filter substrate 10b. That is, the correction processing section 2c may correct a voltage applied to the common electrode based on the temperature of the region (Vcom correction).

In this embodiment, as shown in FIG. 4, the correction processing section 2c includes a correction source data calculating section 2d and a gray scale value calculating section 2e. The correction source data calculating section 2d acquires correction source data (for example, correction value or correction table) corresponding to the calculated temperature of the display panel 10, and stores the correction source data in the memory 2B. In this embodiment, the correction source data calculating section 2d acquires the correction source data corresponding to the plurality of regions A1 to A25 defined on the display panel 10, and stores the correction source data in a state where the correction source data is associated with the respective regions. The stored correction source data is used in gray scale value correction processing until the new temperature of the display panel 10 is calculated.

The gray scale value calculating section 2e calculates output image signals based on the correction source data stored in the memory 2B and input image signals, and outputs the output image signals to the signal line drive circuit 4. To be more specific, the gray scale value calculating section 2e, in outputting an output image signal indicative of a gray scale value of a pixel, reads the correction source data associated with a region which includes the pixel from the memory 2B. Then, the gray scale value calculating section 2e calculates an output image signal for the pixel by making use of the correction source data read from the memory 2B. The gray scale value calculating section 2e executes the above-mentioned processing for all pixels during one frame.

Figure 5:
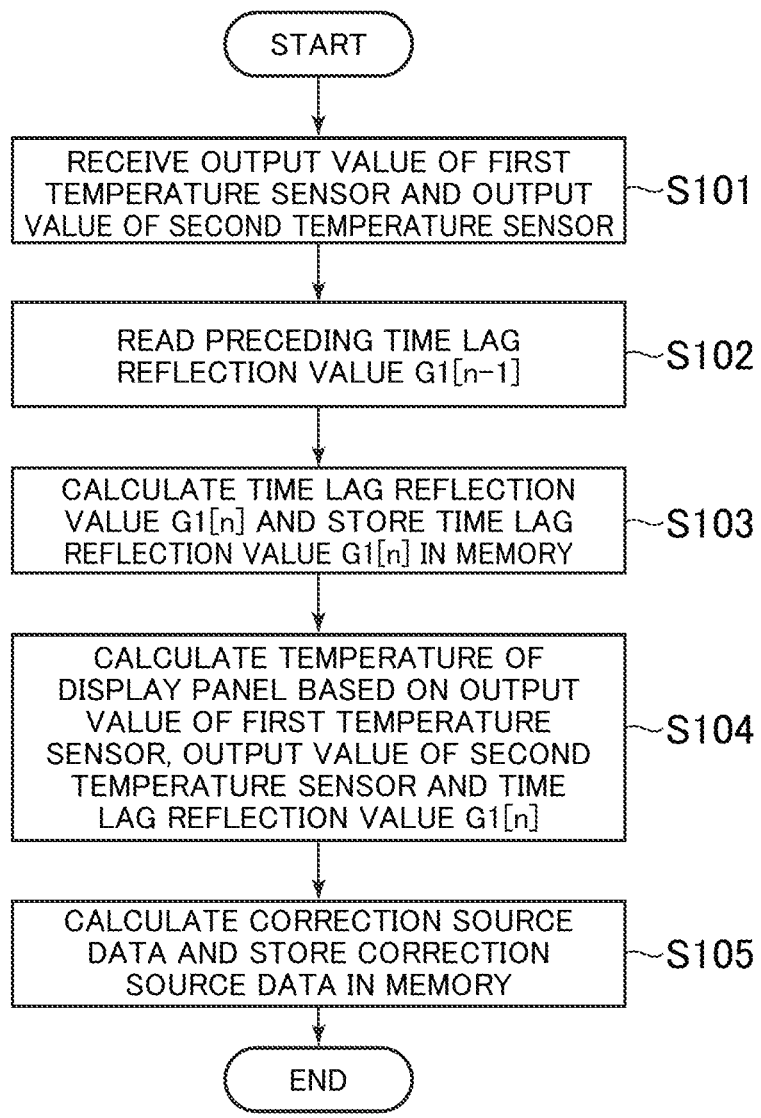
FIG. 5 is a flowchart showing an example of processing which the control unit executes.

The flow of the processing for calculating the temperature of the display panel 10 will be explained. FIG. 5 is a flowchart showing an example of processing executed by the control unit 2. This processing is repeatedly executed at a predetermined cycle so long as the display panel 10 is driven. The cycle of processing may be set longer than an updating cycle (1/60sec) of an image, for example.

Firstly, the control unit 2 (sensor output receiving section 2a) receives an output value (current output value T1[n]) of the first temperature sensor 41 and the output value T2 of the second temperature sensor 42 (S101). Next, the control unit 2 (temperature calculating section 2b) reads the calculation result G1[n−1] of the function G1 calculated in the preceding processing (that is, the control unit 2 reads a time lag reflection value acquired by the processing in the preceding cycle) from the memory 2B (S102). Then, the control unit 2 (temperature calculating section 2b) calculates a new time lag reflection value G1[n] using the formula (3), and stores the time lag reflection value G1[n] in the memory 2B by replacing the preceding time lag reflection value G1[n−1] (S103). The stored time lag reflection value G1[n] is read in step S102 in processing of next cycle. Next, the control unit 2 (temperature calculating section 2b) calculates the temperature Tp of the display panel 10 based on the output value T1[n] of the first temperature sensor 41, the output value T2 of the second temperature sensor 42 and the time lag reflection value G1[n] using the formulae (1) and (2) (S104). Then, the control unit 2 (correction source data calculating section 2d) calculates the correction source data corresponding to the temperature Tp of the display panel 10, and stores the correction source data in the memory 2B by replacing the correction source data with the correction source data calculated in the processing of the preceding cycle (S105), and finishes the processing of this time.

As described above, the display panel 10 of this embodiment is partitioned into the plurality of regions. Accordingly, processings in steps S102 to S105 are executed for the plurality of respective regions. That is, in step S102, G1[n−1] is read for the plurality of respective regions. Then, in step S103, using the coefficient IR1 associated with each region, the time lag reflection value G1[n] of the region is calculated, and the time lag reflection value G1[n] is stored in the memory 2B in a state where the time lag reflection value G1[n] is associated with each region. In step S104, a temperature of each region is calculated using the coefficients K, TK1, TR1 and the offset value OFS1 associated with each region. Then, in step S105, correction source data is selected for each region. Then, the processing of this time is finished when processings in steps S102 to S105 are executed for all regions. As described previously, the display panel 10 may not be always partitioned into the plurality of regions. In this case, the processing of this time is finished when the processings in steps S102 to S105 are finished one time.

[Second Embodiment]

Figure 6:
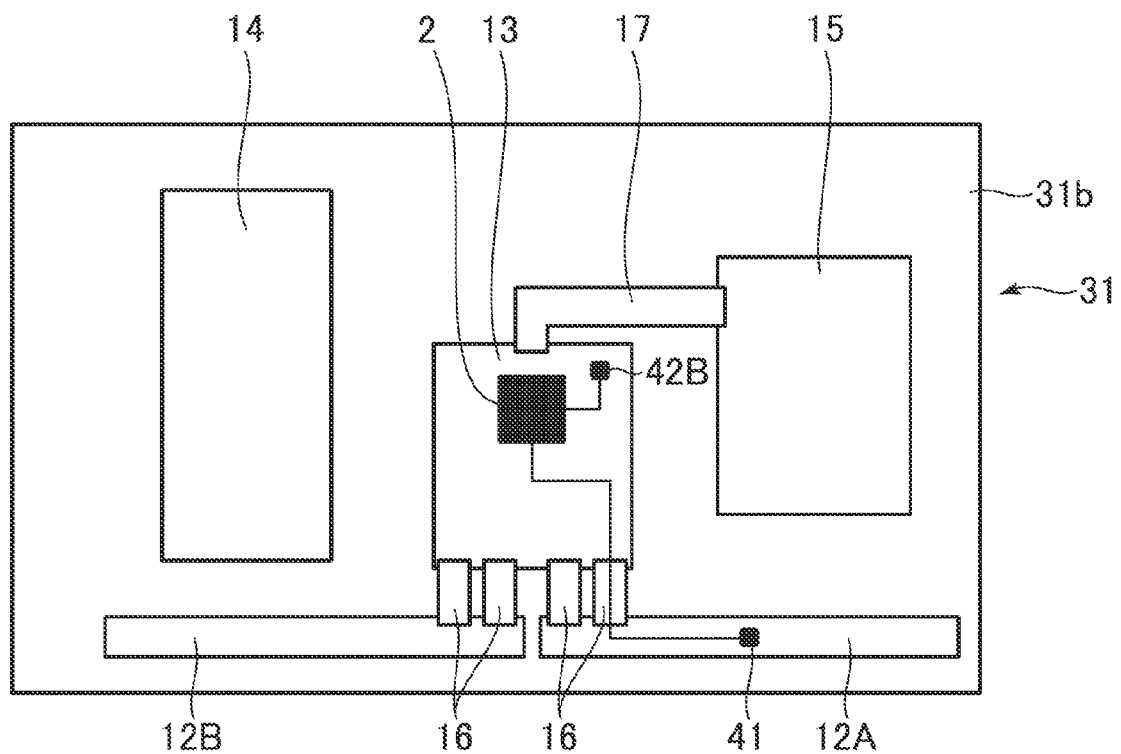
FIG. 6 is a view for explaining a position of a temperature sensor which a display device of a second example includes.

The second embodiment of the present invention will be explained. FIG. 6 is a view for explaining a position of temperature sensors which a display device 1 of the second embodiment includes. In the drawing, in the same manner as FIG. 3, a back surface of a rear frame 31 is shown. With respect to the second embodiment, only the constitutions which differ from the constitutions of the above-explained embodiment will be explained, and other constitutions are substantially equal to the constitutions of the above-mentioned embodiment.

The display device 1 of the embodiment shown in FIG. 6 includes the previously-mentioned first temperature sensor 41 and a second temperature sensor 42B arranged in the inside of a housing 50. Different from the previously-mentioned second temperature sensor 42, it is not always necessary to arrange the second temperature sensor 42B at a position suitable for detecting an environmental temperature. The relative position of the second temperature sensor 42B with respect to a display panel 10 and a heat source device differs from the relative position of the first temperature sensor 41 with respect to the display panel 10 and the heat source device. That is, a distance between the heat source device and the second temperature sensor 42B and a distance between the display panel 10 and the second temperature sensor 42B differ from the corresponding distances with respect to the first temperature sensor 41.

In this embodiment, the distance between the second temperature sensor 42B and the heat source device (LEDs 21) is larger than the distance between the first temperature sensor 41 and the heat source device. For example, the second temperature sensor 42B is mounted on a circuit board which is arranged away from circuit boards 12A, 12B and the LEDs 21. In the embodiment shown in FIG. 6, the second temperature sensor 42B is mounted on a main circuit board 13. The mounting position of the second temperature sensor 42B is not limited to such a position. For example, the second temperature sensor 42B may be mounted on an application circuit board 15 or a power source circuit board 14.

A control unit 2 of this embodiment also includes, as functions thereof, a sensor output receiving section 2a, a temperature calculating section 2b and a correction processing section 2c (see FIG. 4). The functions of the sensor output receiving section 2a and the correction processing section 2c are substantially equal to the functions of the corresponding parts in the previously-mentioned embodiment.

In this embodiment, the temperature calculating section 2b calculates a temperature of the display panel 10 based on the difference between a value based on an output value of the first temperature sensor 41 and a value based on an output value of the second temperature sensor 42B.

The value based on the output value of the first temperature sensor 41 is a calculation result from a first function. The first function is defined so that, when a temperature of the heat source device (for example, LEDs 21) is changed, the calculation result from the first function based on the output value of the first temperature sensor 41 follows an actual change in temperature of the display panel 10. That is, the first function is defined so that, when a temperature of the heat source device is changed and an environmental temperature is fixed, the calculation result of the first function becomes proportional to a temperature of the display panel 10.

The value based on the output value of the second temperature sensor 42B is a calculation result of a second function. The second function is defined so that, when a temperature of the heat source device is changed, the calculation result from the second function based on the output value of the second temperature sensor 42B follows an actual change in temperature of the display panel 10. That is, the second function is defined so that, when a temperature of the heat source device is changed and an environmental temperature is fixed, a calculation result of the second function becomes proportional to a temperature of the display panel 10.

The temperature calculating section 2b calculates a temperature of the display panel 10 based on the difference between these two calculation results. Both of these two calculation results are values which follow an actual change in temperature of the display panel 10 caused by a change in temperature of the heat source device. Accordingly, the difference between two calculation results depends on an environmental temperature, while hardly depending on the change in temperature of the heat source device is suppressed. With such calculation processing, it is possible to realize the temperature estimation with high accuracy without a temperature sensor for detecting the environmental temperature (for example, the previously-mentioned second temperature sensor 42).

There exists a time lag between a change in output value of the first temperature sensor 41 and a change in temperature of the display panel 10. There also exists a time lag between a change in output value of the second temperature sensor 42B and a change in temperature of the display panel 10. In view of the above, the first function outputs, as it's calculation result, a value based on a current output value of the first temperature sensor 41 and an output value of the first temperature sensor 41 received prior to the receiving of the current output value. In the same manner, the second function outputs, as it's calculation result, a value based on a current output value of the second temperature sensor 42B and an output value of the second temperature sensor 42B received prior to the receiving of the current output value. Due to such operations, the time lags can be compensated.

For example, the first function is the previously-mentioned function F1 (for example, formula (2)). As described previously, with the use of the function F1, a time lag between a change in output value of the first temperature sensor 41 and a change in temperature of the display panel 10 can be compensated. That is, with the use of the function F1, when a temperature of the heat source device is changed, a value calculated based on the output value of the first temperature sensor 41 follows the change in temperature of the display panel 10.

The second function is substantially equal to the function F1, for example, and differs from the function F1 only in the coefficients and the offset value. That is, the second function is expressed by the following formulae (4) and (5), for example.

$$F2(T2) = TK2 \times T2[n] + TR2 \times G2[n] + OFS2 \quad \text{Formula (4)}$$

$$G2[n] = T2[n](1-IR2) + G2[n-1] \times IR2 \quad \text{Formula (5)}$$

T2[$n$]: current output value of second temperature sensor 42B

G2[$n$]: value depending on current output value of second temperature sensor 42B and output value of second temperature sensor 42B received prior to the receiving of current output value (hereinafter referred to as a time lag reflection value)

G2[$n-1$]: time lag reflection value acquired in one-time preceding calculation prior to calculation which uses current output value T2[$n$] of second temperature sensor 42B that is, G2[$n-1$] is a value depending on one-time preceding output value T2[$n-1$] and output value received prior to the receiving of one-time preceding output value T2[$n-1$]

TK2, TR2, IR2: coefficients

OFS2: offset value

The current output value T2[$n$] is the latest output value which the sensor output receiving section 2$a$ receives, for example. The current output value T2[$n$] may not be always the latest output value. For example, when noises are detected by the sensor output receiving section 2$a$, the current output value T2[$n$] may be also an output value received at one-time preceding sampling timing or two-time preceding sampling timing. Further, although the function G2 expressed by the formula (5) is a first-order infinite impulse response filter, the function G2 is not always limited to such a filter. The function G2 may be, in the same manner as the function G1, a second-order infinite impulse response filter or a third-order infinite impulse response filter. Further, the function G2 may be a finite impulse response filter. Further, the function F2 is not always limited to the formula (4) and may be modified in various forms so that a time lag between a change in output value of the second temperature sensor 42B and a change in temperature of the display panel 10 can be compensated.

The temperature calculating section 2$b$ calculates a temperature Tp of the display panel 10 using the following formula (6), for example.

$$Tp = \{K2 \times F1(T1) - K1 \times F2(T2)\} / \{K2 - K1\} \quad \text{Formula (6)}$$

T1: output value of first temperature sensor 41

F1: first function for calculating value based on output value of first temperature sensor 41

T2: output value of second temperature sensor 42B

F2: second function for calculating value based on output value of second temperature sensor 42B K1, K2: coefficients In the formula (6), T1 indicates both the current output value of the first temperature sensor 41 and the output value of the first temperature sensor 41 received prior to the receiving of the current output value. Further, T2 indicates both the current output value of the second temperature sensor 42B and the output value of the second temperature sensor 42B received prior to the receiving of the current output value.

The formula (6) can be converted as follows.

$$Tp = F1(T1) + \{(F1(T1) - F2(T2)) \times \{K1/(K2-K1)\}\} \quad \text{Formula (6-1)}$$

The second term in the formula (6-1) expresses a value corresponding to an environmental temperature, that is, a value does not have the influence exerted by a change in temperature of a heat source device. Further, the first term of the formula (6-1) becomes a term which compensates for a time lag between a change in output value of the first temperature sensor 41 and a change in temperature of the display panel 10.

As described previously, the function F1 which is the first function is defined so that, when a temperature of the heat source device is changed, the calculation result of the function F1 based on an output value of the first temperature sensor 41 follows an actual change in temperature of the display panel 10. Accordingly, the function F1 and the temperature of the display panel 10 have the relationship expressed by the following formula (7).

$$Tp = F1(T1) + K1 \times Tr \quad \text{Formula (7)}$$

Tp: temperature of display panel 10

Tr: environmental temperature

Further, as described previously, the function F2 which is the second function is defined so that, when a temperature of the heat source device is changed, the calculation result of the function F2 based on the output value of the second temperature sensor 42B follows an actual change in temperature of the display panel 10. Accordingly, the function F2 and the temperature of the display panel 10 have the relationship expressed by the following.

$$Tp = F2(T2) + K2 \times Tr \quad \text{Formula (8)}$$

By erasing the environmental temperature Tr from the formula (7) and the formula (8), the above-mentioned formula (6) is made.

As described previously, the display panel 10 is partitioned into the plurality of regions (see FIG. 1). Accordingly, the coefficients TK2, TR2, IR2, K1, K2 and the offset value OFS2 in the formulae (4), (5), (6) are also stored in the memory 2B in a state where the coefficients and the offset value are associated with the plurality of respective regions. Then, the temperature calculating section 2b calculates the temperature of the display panel 10 for the plurality of respective regions using these coefficients.

Figure 7:
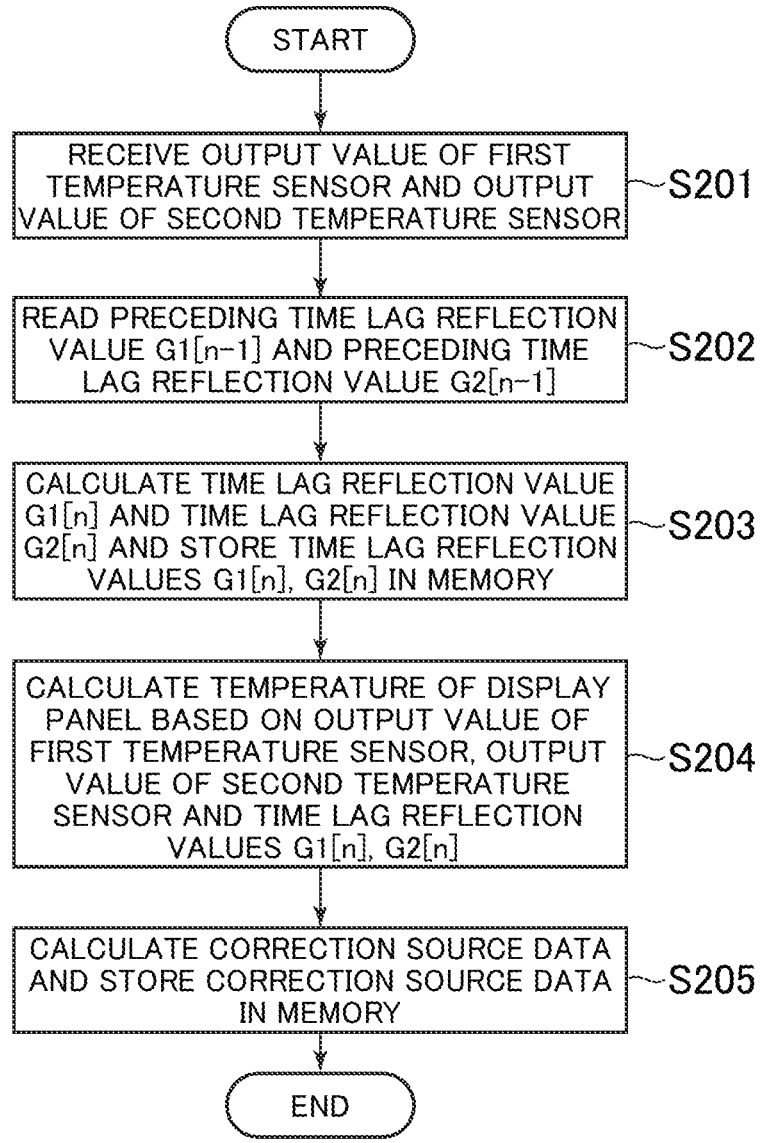
FIG. 7 is a flowchart showing an example of processing which a control unit of the second example executes.

The flow of the processing for calculating the temperature of the display panel 10 in the second embodiment is explained. FIG. 7 is a flowchart showing an example of processing executed by the control unit 2 of this embodiment. This processing is also, in the same manner as the embodiment shown in FIG. 5, repeatedly executed at a predetermined cycle so long as the display device 1 is driven.

Firstly, the control unit 2 (sensor output receiving section 2a) receives an output value (current output value T1[n]) of the first temperature sensor 41 and an output value (current output value T2[n]) of the second temperature sensor 42B (S201). Next, the control unit 2 (temperature calculating section 2b) reads calculation results G1[n−1], G2[n−1] of the functions G1, G2 calculated in the processing of a preceding cycle from the memory 2B (S202). Then, the control unit 2 (temperature calculating section 2b) calculates a new time lag reflection value G1[n] using the formula (3), and stores the time lag reflection value G1[n] in the memory 2B by replacing the preceding time lag reflection value G1[n−1] (S203). Further, the control unit 2 (temperature calculating section 2b) calculates a new time lag reflection value G2[n] using the formula (5), and stores the time lag reflection value G2[n] in the memory 2B by replacing the preceding time lag reflection value G2[n−1] (S203). The stored time lag reflection values G1[n], G2[n] are used in the processing of next cycle. Next, the control unit 2 (temperature calculating section 2b) calculates a temperature of the display panel 10 using the formula (6) (S204). Although the formulae (2), (4), (6) are described in a separate manner in the above-mentioned explanation for facilitating the explanation, the calculations expressed by the formulae (2) and (4) may not be executed separately from the calculation expressed by the formula (6).

Thereafter, the control unit 2 (correction source data calculating section 2d) executes the processing in step S205 in the same manner as the processing in step S105 shown in FIG. 5, and finishes this-time processing. As described previously, the display panel 10 of this embodiment is partitioned into the plurality of regions. Accordingly, in the same manner as the processing explained in conjunction with FIG. 5, the processing in steps S202 to S205 is executed with respect to the plurality of respective regions.

The processing which the temperature calculating section 2b of the second embodiment executes is not limited to the processing explained heretofore. For example, the formula (6) can be modified in various forms. That is, the number of temperature sensors which the display device 1 includes is not always limited to two. The number of the temperature sensors may be increased more. For example, when three temperature sensors are provided, the temperature calculating section 2b may calculate a temperature of the display panel 10 using the following formula (9), for example. In the formula (9), functions and variables which are identical with the functions and the variables which are explained heretofore are indicated by the same characters.

$$Tp = Fc(Tc) + (F1(T1) - F2(T2)) \times Ks \quad \text{Formula (9)}$$

Tc: output value of third temperature sensor

Fc: function where output value of third temperature sensor is used as variable

In the formula (9), Tc indicates both a current output value of the third temperature sensor and an output value of the third temperature sensor received prior to the receiving of the current output value. The function Fc is, in the same manner as the functions F1 and F2, defined so that a calculation result Fc(Tc) of the function Fc becomes a value which follows a change in temperature of the display panel 10 when a temperature of a heat source device is changed and an environmental temperature is fixed. That is, the function Fc is a function which compensates for a time lag between a change in output value of the third temperature sensor and a change in temperature of the display panel 10.

[Third Embodiment]

Figure 8:
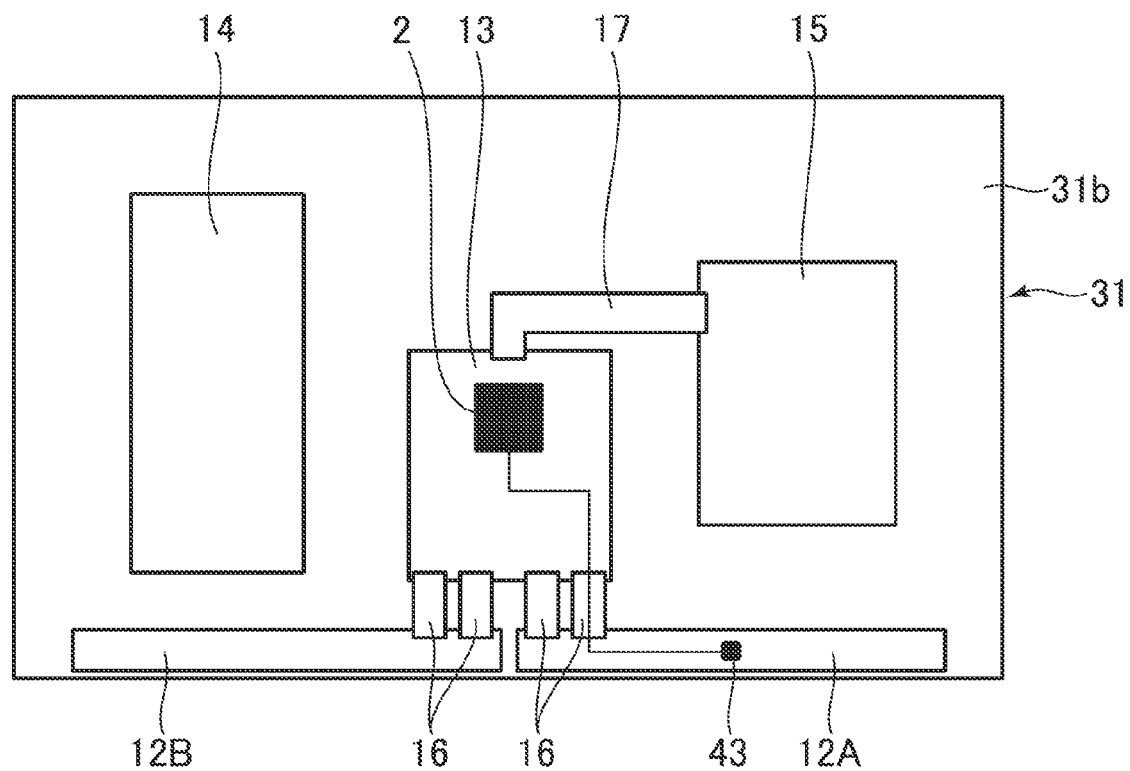
FIG. 8 is a view for explaining a position of a temperature sensor which a display device of a third example includes.

The third embodiment of the present invention will be explained. FIG. 8 is a view for explaining a position of a temperature sensor which a display device 1 of the third embodiment includes. In the drawing, in the same manner as FIG. 3, a back surface of a rear frame 31 is shown. With respect to the third embodiment, only the constitutions which differ from the constitutions of the above-mentioned embodiments are explained, and other constitutions are substantially equal to the constitutions of the above-mentioned embodiments.

As shown in FIG. 8, the display device 1 of this embodiment includes a temperature sensor 43. In the embodiment shown in FIG. 8, the temperature sensor 43 is mounted on a circuit board 12A. The position of the temperature sensor 43 is not limited to such a position. For example, the temperature sensor 43 may be mounted on a main circuit board 13 or an application circuit board 15.

A control unit 2 controls a device which constitutes a heat source in the inside of the display device 1. The control unit 2 of the embodiment explained here controls, as described previously, LEDs 21 which is a light source of a backlight unit 20. The control unit 2 outputs control information corresponding to brightness of the LEDs 21 to a backlight drive circuit 6 (see FIG. 1). The backlight drive circuit 6 supplies drive power corresponding to the control information to the LEDs 21. The control information is an electric current value of the drive power supplied to the LEDs 21, for example. Further, when a duty control is applied to the LEDs 21, the control information is a lighting time (duty ratio) of the LEDs 21 (hereinafter the duty ratio and the current value being referred to as a control command value).

As described previously, the control unit 2 includes a high brightness mode, an intermediate brightness mode and a low brightness mode as a control mode thereof, and outputs a control command value corresponding to each control mode as the control information. That is, the control unit 2 outputs a control command value corresponding to a current control mode out of three control command values corresponding to three respective control modes.

The control by the control unit 2 is not limited to such control modes. For example, the number of control modes may be increased more. Also in this case, the control unit 2 outputs a control command value corresponding to the currently selected control mode. Further, the display panel 10 may be partitioned into a plurality of regions, and the control unit 2 may execute area drive control where brightness of the LEDs 21 is controlled for every region of the display panel 10. In this case, the control unit 2 outputs a control command value for the LEDs 21 associated with each one of the plurality of regions of the display panel 10 (in this embodiment, the plurality of regions defined on the display panel 10 for the area drive control may not be same as the regions A1 to A25 shown in FIG. 1). In the third embodiment, the device which the control unit 2 controls is not limited to the backlight unit 20. That is, in the third embodiment, the device which the control unit 2 controls may be a device which is different from the backlight unit 20 and generates a heat changing in response to control by the control unit 2. In this case, control information supplied to such a device is a control command value.

Figure 9:
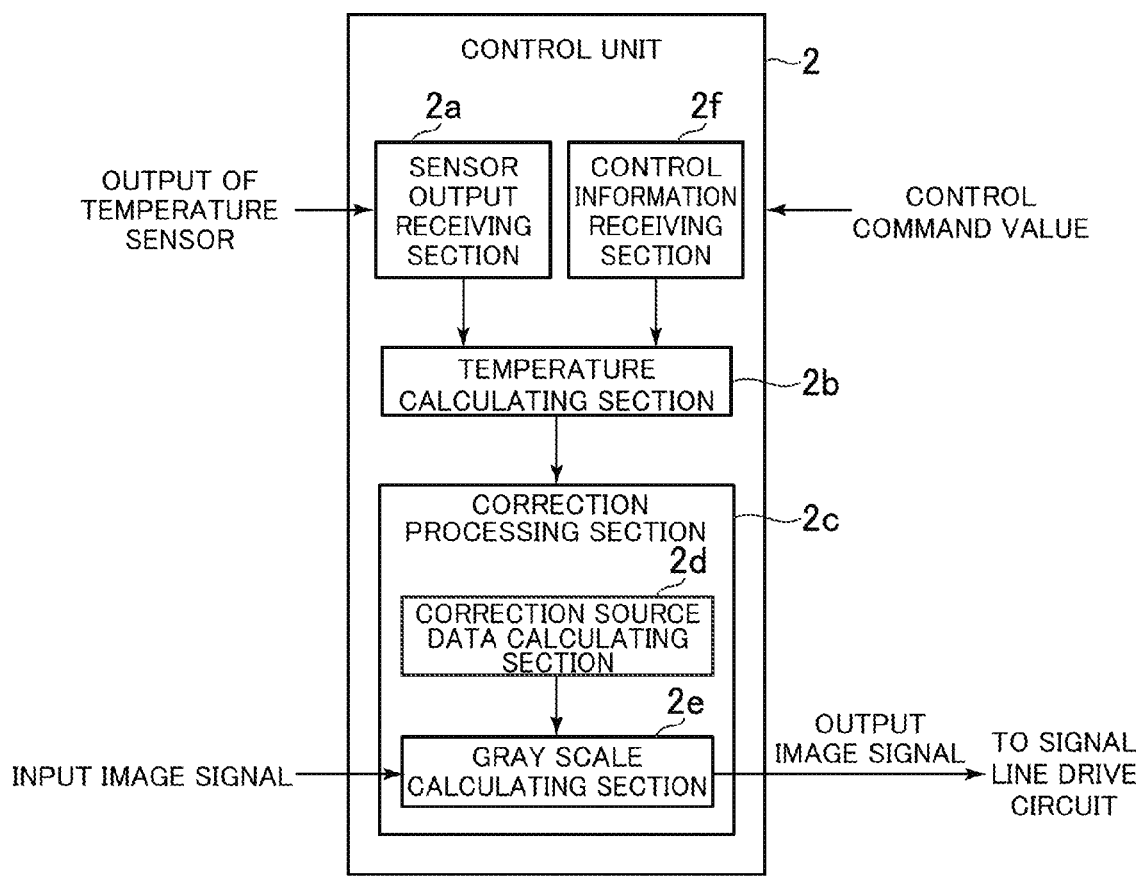
FIG. 9 is a block diagram showing functions which a control unit of the third example includes.

FIG. 9 is a block diagram showing functions of the control unit 2 of the third embodiment. In this embodiment, the control unit 2 includes a control information receiving section 2f in addition to a sensor output receiving section 2a, a temperature calculating section 2b and a correction processing section 2c.

The control information receiving section 2f receives a control command value outputted to the backlight drive circuit 6 at a preset sampling cycle. For example, when the control unit 2 stores a control command value in a memory 2B, the control information receiving section 2f reads the control command value from the memory 2B. When the area drive control for the backlight unit 20 is executed, a comprehensive control command value may be calculated based on a plurality of control command values corresponding to the plurality of respective regions of the display panel 10. For example, an average value of the plurality of control command values corresponding to the plurality of respective regions of the display panel 10 may be calculated.

The sensor output receiving section 2a receives an output value of the temperature sensor 43 at a preset sampling cycle in the same manner as the previously-mentioned embodiment.

The temperature calculating section 2b of this embodiment calculates a temperature of the display panel 10 based on an output value of the temperature sensor 43 and a control command value. A heat value generated from a device which constitutes a heat source has the correlation with a control command value. For example, when brightness of the LEDs 21 is increased, a heat value is increased. Accordingly, with the use of calculation which uses the control command value, the temperature estimation with high accuracy can be realized using a small number of sensors.

In this embodiment, the temperature calculating section 2b calculates a temperature of the display panel 10 based on the difference between a value based on an output value of the temperature sensor 43 and a value based on a control command value. Due to such processing, in the same manner as the second embodiment, it is possible to realize the temperature estimation with high accuracy without a temperature sensor for detecting the environmental temperature (for example, the previously-mentioned second temperature sensor 42). The value based on the output value of the temperature sensor 43 may be an output value per se of the temperature sensor 43.

There exists a time lag between a change in output value of the temperature sensor 43 and a change in temperature of the display panel 10. A time lag also exists between a change in control command value and a change in temperature of the display panel 10 as well as between a change in control command value and a change in output value of the temperature sensor 43. In view of the above, in this embodiment, to compensate for these time lags, the temperature calculating section 2b calculates a temperature of the display panel 10 based on a current output value of the temperature sensor 43, an output value of the temperature sensor 43 received prior to the receiving of the current output value, a current control command value, and a control command value received prior to the receiving of the current control command value.

The temperature calculating section 2b calculates the temperature of the display panel 10 using the following formula (10), for example.

$$Tp = F3(T3') + K3 \times \{T3 - Fr(Cv)\}/Kr \quad \text{Formula (10)}$$

Tp: temperature of display panel 10
T3, T3': output values of temperature sensor 43

F3: function where output value of temperature sensor 43 is used as variable
Cv: control command value
Fr: function where control command value is used as variable
K3, Kr: coefficients The variable T3' in the function F3 expresses both the current output value of temperature sensor 43 and the output value of temperature sensor 43 received prior to the receiving of the current output value. Cv expresses both the current control command value, and the control command value received prior to the receiving of the current control command value.

In the formula (10), the above-mentioned value based on an output value of the temperature sensor 43 is the output value T3 per se of the temperature sensor 43. In this case, the function Fr for acquiring a value Fr (Cv) based on a control command value is defined so that the calculation result from the function Fr follows the output value of the temperature sensor 43 in a state where the control command value is changed, that is, a temperature of the LEDs 21 is changed (hereinafter, the function Fr will be referred to as a command value conversion function). That is, the command value conversion function Fr is defined so that the calculation result Fr (Cv) is substantially proportional to the output value of the temperature sensor 43 in a state where the control command value is changed and an environmental temperature is fixed. With the use of such a command value conversion function, the difference between the output value of the temperature sensor 43 and the calculation result Fr (Cv) becomes a value which depends on the environmental temperature and hardly has the influence exerted by a change in temperature of the LEDs 21 (change in control command value). Accordingly, by executing processing where a temperature of the display panel 10 is calculated using such difference, it is possible to realize the temperature estimation with high accuracy without a temperature sensor for detecting the environmental temperature. The second term in the formula (10) depends on the environmental temperature and hardly has the influence exerted by the change in temperature of the LEDs 21.

Further, as described previously, there exists a time lag between a change in control command value and a change in output value of the temperature sensor 43. That is, the output value of the temperature sensor 43 is changed with a delay from the change in control command value. The command value conversion function Fr is defined such that the calculation result from the function is based on the current control command value and the control command value received prior to the receiving of the current control command value. For example, the command value conversion function Fr has the substantially similar form as the previously mentioned function F1 (for example, formula (2)) and differs from the function F1 only in coefficients and an offset value. That is, the command value conversion function Fr is expressed by the following formula (11), for example.

$$Fr(Cv) = TKr \times Cv[n] + TRr \times Gr[n] + OFSr \quad \text{Formula (11)}$$

Cv[n]: current control command value
Gr[n]: value depending on current control command value and control command value received prior to the receiving of current control command value (hereinafter referred to as time lag reflection value)
TKr, TRr: coefficients
OFSr: offset value The current control command value Cv[n] is the latest output value which the control information receiving section 2f receives, for example. The current control command value Cv[n] may not be always the latest control command value.

In the formula (11), the temperature calculating section 2b multiplies the current control command value Cv[n] and the time lag reflection value Gr[n] based on a control command value received prior to the receiving of the current control command value Cv[n] by the coefficients TKr, TRr respectively. The coefficient TKr and the coefficient TRr depend on the magnitude of distance between the temperature sensor 43 and the LEDs 21.

The time lag reflection value Gr[n] in the formula (11) is, in the same manner as the time lag reflection value G1[n] in the formula (3), expressed by the following formula (12), for example.

$$Gr[n]=Cv[n]\times(1-IRr)+Gr[n-1]\times IRr \quad \text{Formula (12)}$$

Gr[n−1]: time lag reflection value calculated in one-time preceding calculation processing prior to calculation processing which uses current control command value Cv[n]

that is, Gr[n−1] is a value depending on one-time preceding control command value Cv[n−1] and control command value received prior to the receiving of one-time preceding control command value Cv[n−1]

IRr: coefficient

The function Gr (formula (12)) is an infinite impulse response filter, and a time lag reflection value received prior to the receiving of the time lag reflection value Gr[n] is fed back to the time lag reflection value Gr[n]. That is, the function Gr uses, as it's variables, a calculation result Gr[n−1] acquired by the function Gr based on the control command value Cv[n−1] received prior to the receiving of the current control command value Cv[n] and the current control command value Cv[n]. In this embodiment, the function Gr is a first-order infinite impulse response filter. The coefficient IRr depends on a distance between the temperature sensor 43 and the LEDs 21. For example, when the distance between the temperature sensor 43 and the LEDs 21 is large, the coefficient IRr becomes large. The function Gr may be a second-order infinite impulse response filter or a third-order infinite impulse response filter. Further, the function Gr may also be a finite impulse response filter.

As described above, there exists a time lag between a change in output value of the temperature sensor 43 and a change in temperature of the display panel 10. In view of the above, also in this embodiment, the temperature calculating section 2b calculates a temperature of the display panel 10 based on a current output value of the temperature sensor 43 and an output value of the temperature sensor 43 received prior to the receiving of the current output value for compensating for the time lag. In this embodiment, the function F3 in the formula (10) is for compensating for the time lag. The function F3 has the substantially similar form as the previously mentioned function F1 (for example, formula (2)) and differs from the function F1 only in coefficients and an offset value. That is, the function F3 is expressed by the following formulae (13) and (14), for example.

$$F3(T3)=TK3\times T3[n]+TR3\times G3[n]+OFS3 \quad \text{Formula (13)}$$

$$G3[n]=T3[n]\times(1-IR3)+G3[n-1]\times IR3 \quad \text{Formula (14)}$$

T3[n]: current output value of temperature sensor 43

G3[n]: value depending on current output value of temperature sensor 43 and output value of temperature sensor 43 received prior to the receiving of current output value of temperature sensor 43 (hereinafter referred to as time lag reflection value)

G3[n−1]: time lag reflection value acquired in one-time preceding calculation, that is, value depending on one-time preceding output value T3[n−1] and output value received prior to the receiving of one-time preceding output value T3[n−1]

TK3, TR3: coefficients

OFS2: offset value

IR2: coefficient

Although the function G3 expressed by the formula (14) is a first-order infinite impulse response filter, the function G3 is not always limited to such a filter. The function G3 may be, in the same manner as the function G1, a second-order infinite impulse response filter or a third-order infinite impulse response filter. The function G3 may be a finite impulse response filter. Further, the function F3 may be modified in various forms so that the time lag between a change in output value of the temperature sensor 43 and a change in temperature of the display panel 10 can be compensated.

The formula (10) is introduced as follows, for example. The relationship between the command value conversion function Fr and an output value of the temperature sensor 43 is expressed by the following formula (15).

$$T3=Fr(Cv)+Kr\times Tr+\epsilon \quad \text{Formula (15)}$$

Tr: environmental temperature

ϵ: error

An output value of the temperature sensor 43 and a temperature of the display panel 10 have the relationship expressed by the following formula (16), for example.

$$Tp=F3(T3')+K3\times Tr \quad \text{Formula (16)}$$

Tp: temperature of display panel 10

By erasing the environmental temperature Tr from the formulae (15), (16), the following formula (17) is acquired.

$$Tp=F3(T3')+K3\{T3-Fr(Cv)\}/Kr-(K3/Kr)\times\epsilon \quad \text{Formula (17)}$$

The formula (10) is made by removing a term including the error ϵ from the formula (17). The coefficients K3, Kr depend on the positional relationship among the LEDs 21, the temperature sensor 43 and the display panel 10. Accordingly, by setting the positional relationship among these components such that the coefficient K3 becomes small in the formula (16) and the coefficient Kr becomes large in the formula (15), the term including the error ϵ in the formula (17) can be made small.

In the third embodiment explained heretofore, the temperature calculating section 2b calculates a temperature of the display panel 10 based on the difference between the output value T3 per se of the temperature sensor 43 and the value based on the control command value. However, the value based on the output value of the temperature sensor 43 may be a calculation result of the previously mentioned function F3 (formula (13)), for example. That is, the temperature calculating section 2b may calculate the temperature of the display panel 10 based on the difference between the calculation result F3 (T3) of the function F3 and the value Fr (Cv) based on the control command value. The function F3 is defined so that, when a temperature of the LEDs 21 is changed, the calculation result of the function F3 based on the output value of the temperature sensor 43 follows an actual change in temperature of the display panel 10. In this case, the previously-mentioned command value conversion function Fr may be defined so that the calculation result of the function Fr based on the control command value follows a change in temperature of the display panel 10. In this case, the temperature calculating section 2b calculates the temperature of the display panel 10 by the following formula (18), for example.

$$Tp=F3(T3')+K3\times\{F3(T3')-Fr(Cv)\}/Kr \quad \text{Formula (18)}$$

In such calculation processing, both the calculation result F3(T3) of the function F3 and the calculation result Fr (Cv) of the command value conversion function follow a change in temperature of the display panel 10. Accordingly, the difference depends on an environmental temperature and hardly has the influence of a change in temperature of the LEDs 21. As a result, also with such calculation processing, it is possible to realize the temperature estimation with high accuracy without a temperature sensor dedicated for detecting the environmental temperature.

As described previously, the display panel 10 is partitioned into the plurality of regions (see FIG. 1). Accordingly, the coefficients K3, TK3, TR3, IR3, and the offset value OFS3 in the formulae (10), (13), (14) are also stored in the memory 2B in a state where the coefficients and the offset value are associated with the plurality of respective regions. Then, the temperature calculating section 2b calculates the temperature of the display panel 10 for the plurality of respective regions using these coefficients.

The flow of the processing for calculating the temperature of the display panel 10 in the third embodiment will be explained. FIG. 10 is a flowchart showing an example of processing executed by the control unit 2 of the third embodiment. This processing is also, in the same manner as the embodiment shown in FIG. 5, repeatedly executed at a predetermined cycle so long as the display panel 10 is driven.

Firstly, the control unit 2 (sensor output receiving section 2a, control information receiving section 2f) receives an output value (current output value T3[n]) of the temperature sensor 43 and a current control command value (S301). Next, the control unit 2 (temperature calculating section 2b) reads calculation results G3[n−1], Gr[n−1] of the functions G3, Gr calculated in the previous-cycle processing from the memory 2B (S302). Then, the control unit 2 (temperature calculating section 2b) calculates a new time lag reflection value G3[n] using the formula (14), and stores the time lag reflection value G3[n] in the memory 2B by replacing the preceding time lag reflection value G3[n−1] (S303). Further, the control unit 2 (temperature calculating section 2b) calculates a new time lag reflection value Gr[n] using the formula (12), and stores the time lag reflection value Gr[n] in the memory 2B by replacing the preceding time lag reflection value Gr[n−1] (S303). Next, the control unit 2 (temperature calculating section 2b) calculates a temperature of the display panel 10 using the formula (10) (S304). Although the formulae (10), (11), (13) are described in a separate manner in the above-mentioned explanation for facilitating the explanation, the calculations expressed by the formulae (11) and (13) may not be executed separately from the calculation expressed by the formula (10).

Thereafter, the control unit 2 (correction source data calculating section 2d) executes the processing in step S305 in the same manner as the processing in step S105 shown in FIG. 5, and finishes this-time processing. As described previously, the display panel 10 of this embodiment is partitioned into the plurality of regions. Accordingly, in the same manner as the processing explained in conjunction with FIG. 5, the processing in steps S302 to S305 is executed for the plurality of respective regions.

A method of introducing the coefficients and the offset value explained heretofore will be explained. Firstly, a temperature detector (for example, a thermo couple, hereinafter referred to as an actual temperature detector) is arranged at a plurality of positions (25 positions in this embodiment) on a surface of the liquid crystal panel 10. For example, one actual temperature detector is provided to the respective regions A1 to A25. Further, the actual temperature detector may be provided to corners of the regions A1 to A25. Then, in a plurality of temperature environments, the display device 1 is driven while changing the control mode of the backlight unit 20. For example, the control mode (high brightness mode, intermediate brightness mode, low brightness mode) of the backlight unit 20 is changed sequentially under 0-degree environment and, thereafter, the control mode of the backlight unit 20 is sequentially changed under another temperature environment. In such a case, an actual temperature of the liquid crystal panel 10 is measured at a predetermined time interval (for example, 10-second interval) by the actual temperature detectors, and output values of the temperature sensors 41, 42, 42B, 43 are acquired at a predetermined time interval. By such temperature measurement, a large number of actually measured temperatures and a large number of output values of the temperature sensors 41, 42, 42B, 43 corresponding to the actually measured temperatures respectively are acquired. Then, an approximation formula (especially, coefficients and offset values) for converting the output values of the temperature sensors 41, 42, 42B, 43 to the actually measured temperatures is introduced. The approximation formula can be introduced by a least-squares method, for example.

As has been explained heretofore, the control unit 2 calculates a temperature of the display panel 10 based on current output values of the temperature sensors 41, 42, 42B, 43 and output values of the temperature sensors 41, 42, 42B, 43 received prior to the receiving of the current output values. Accordingly, a time lag between a change in output values of the temperature sensors 41, 42, 42B, 43 and a change in temperature of the display panel 10 can be compensated. As a result, it is possible to realize the temperature estimation with high accuracy even when a temperature of a device which constitutes a heat source is changed.

The control unit 2 multiplies current output values of the temperature sensors 41, 42, 42B, 43 and values acquired from output values of the temperature sensors 41, 42, 42B, 43 received prior to the receiving of the current output values (G1[n], G2[n], G3[n] in the above-mentioned explanation) by coefficients, and calculates a temperature of the display panel 10 based on the sum of the coefficient multiplied values. According to this control unit 2, by changing the coefficient corresponding to magnitude of a time lag, an equivalence equation between a temperature of the display panel 10 and an output value of the temperature sensor can be realized.

The functions G1, G2, G3 used by the control unit 2 have, as variables thereof, calculation results (G1[n−1], G2[n−1], G3[n−1] in the above-mentioned explanation) of the functions G1, G2, G3 acquired based on output values received prior to the receiving of current output values and the current output values. That is, the functions G1, G2, G3 are infinite impulse response filters. Accordingly, compared to a case where the functions G1, G2, G3 are finite impulse response filters, for example, a memory capacity used for the calculation of a temperature of the display panel 10 can be reduced.

The functions G1, G2, G3 are first-order infinite impulse response filters. Accordingly, the memory capacity used for the calculation of the temperature of the display panel 10 can be further reduced.

In the first embodiment, the display device 1 includes, in addition to the first temperature sensor 41, the second temperature sensor 42 which is located more distant from the device which is a heat source than the first temperature sensor 41 is and detects a temperature of an environment where the display device 1 is placed. The control unit 2 of the first embodiment calculates a temperature of the display panel 10 based on an output value of the second temperature sensor 42 and an output value of the first temperature sensor 41. Accordingly, even when the environmental temperature and the temperature of the device which is a heat source are changed independently, it is possible to realize the temperature estimation with high accuracy.

In the second embodiment, the display device 1 includes the first temperature sensor 41 and the second temperature sensor 42B arranged in the inside of the housing 50. The control unit 2 calculates a temperature of the display panel 10 based on the difference between a value (F1(T1)) based on an output value of the first temperature sensor 41 and a value (F2(T2)) based on an output value of the second temperature sensor 42B. Accordingly, it is possible to realize the temperature estimation with high accuracy without a temperature sensor for detecting the environmental temperature.

In the second embodiment, the value (F1(T1)) based on the output value of the first temperature sensor 41 is calculated based on a current output value of the first temperature sensor and an output value of the first temperature sensor received prior to the receiving of the current output value. Further, the value (F2(T2)) based on the output value of the second temperature sensor 42 is calculated based on a current output value of the second temperature sensor 42B and an output value of the second temperature sensor 42B received prior to the receiving of the current output value. Accordingly, it is possible to realize the temperature estimation with high accuracy even when there exists a time lag between a change in output value of the first temperature sensor 41 and a change in temperature of the display panel 10, and there exists a time lag between a change in output value of the second temperature sensor 42B and a change in temperature of the display panel 10.

In the second embodiment, the first function F1 for calculating the value based on the output value of the first temperature sensor 41 is defined so that, when a temperature of the device which is a heat source is changed, the calculation result of the first function F1 based on the output value of the first temperature sensor 41 follows a change in temperature of the display panel 10. The second function F2 for calculating the value based on the output value of the second temperature sensor 42 is defined so that, when a temperature of the device which is the heat source is changed, the calculation result of the second function F2 based on the output value of the second temperature sensor 42 follows a change in temperature of the display panel 10. Accordingly, the temperature of the display panel 10 can be calculated based on the value which depends on an environmental temperature and hardly has the influence exerted by a change in temperature of the device which is the heat source.

The control unit 2 controls the LEDs 21 of the backlight unit 20 which is the heat source. In the third embodiment, the control unit 2 calculates a temperature of the display panel 10 based on an output value of the temperature sensor 43, and a control command value which the control unit 2 outputs as control information on the backlight unit 20. Accordingly, it is possible to realize the temperature estimation with high accuracy using the small number of sensors.

In the third embodiment, the control unit 2 calculates a temperature of the display panel 10 based on the difference between a value based on an output value of the temperature sensor 43 and a value (Fr(Cv)) based on a control command value. Accordingly, it is possible to realize the temperature estimation with high accuracy without a temperature sensor for detecting an environmental temperature.

In the third embodiment, a control command value is control information for controlling brightness of the LEDs 21 of the backlight unit 20. A drive state of the backlight unit 20 largely influences a temperature of the display panel 10. Accordingly, it is possible to realize the temperature estimation with high accuracy by using the control command value for controlling the LEDs 21 of the backlight unit 20.

In the third embodiment, the value (Fr(Cv)) acquired from the control command value is calculated based on a current control command value and a control command value outputted prior to the acquisition of the current control command value. Accordingly, it is possible to realize the temperature estimation with high accuracy even when there exists a time lag between a change in control command value and a change in output value of the temperature sensor 43 or between a change in control command value and a change in temperature of the display panel 10.

The present invention is not limited to the embodiments which have been explained heretofore, and various modifications are conceivable with respect to the present invention.

For example, a function used for calculating a temperature of the display panel 10 is not always limited to the above-mentioned infinite impulse response filter.

Further, the number of the temperature sensors is not limited to the number described above. The number of the temperature sensors may be suitably changed corresponding to a size of the display panel 10 or the number of devices which constitute heat sources.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a display panel;
a housing which houses the display panel and a heat source device which is a heat source in the display device when the display panel is driven;
a temperature sensor arranged in the inside of the housing; and
a control unit which calculates a temperature of the display panel based on an output value of the temperature sensor,
wherein the control unit calculates the temperature of the display panel based on a current output value of the temperature sensor and an output value of the temperature sensor received prior to the receiving of the current output value; and
wherein the control unit multiplies the current output value of the temperature sensor by a coefficient, multiplies a value acquired from the output value of temperature sensor received prior to the receiving of the current output value by a coefficient, and calculates the temperature of the display panel based on the sum of those multiplied values.

2. A display device comprising:
a display panel;
a housing which houses the display panel and a heat source device which is a heat source in the display device when the display panel is driven;
a temperature sensor arranged in the inside of the housing and outputting an output value at preset sampling cycle; and
a control unit which calculates a temperature of the display panel based on the output value of the temperature sensor, wherein
the control unit calculates the temperature of the display panel based on a current output value of the temperature sensor and an output value of the temperature sensor received in a preceding cycle prior to the receiving of the current output value;

a first temperature sensor and a second temperature sensor are employed as the temperature sensor;

the control unit calculates the temperature of the display panel based on the difference between a value based on an output value of the first temperature sensor and a value based on an output value of the second temperature sensor;

the value based on the output value of the first temperature sensor is calculated based on the current output value of the first temperature sensor and an output value of the first temperature sensor received prior to the receiving of the current output value, and the value based on the output value of the second temperature sensor is calculated based on the current output value of the second temperature sensor and an output value of the second temperature sensor received prior to the receiving of the current output value.

3. A display device comprising:

a display panel;

a housing which houses the display panel and a heat source device which is a heat source in the display device when the display panel is driven;

a temperature sensor arranged in the inside of the housing and outputting an output value at a preset sampling cycle; and a control unit which calculates a temperature of the display panel based on the output value of the temperature sensor, wherein the control unit calculates the temperature of the display panel based on a current output value of the temperature sensor and an output value of the temperature sensor received in a preceding cycle prior to the receiving of the current output value;

a first temperature sensor and a second temperature sensor are employed as the temperature sensor;

the control unit calculates the temperature of the display panel based on the difference between a value based on an output value of the first temperature sensor and a value based on an output value of the second temperature sensor;

the value based on the output value of the first temperature sensor is a calculation result of a first function, the value based on the output value of the second temperature sensor is a calculation result of a second function, the first function is defined so that the calculation result based on the output value of the first temperature sensor follows a temperature change of the display panel when a temperature of the heat source device is changed, and the second function is defined so that the calculation result based on the output value of the second temperature sensor follows the temperature change of the display panel when the temperature of the heat source device is changed.

4. A display device comprising:

a display panel;

a housing which houses the display panel and a heat source device which is a heat source in the display device when the display panel is driven;

a temperature sensor arranged in the inside of the housing and outputting an output value at a preset sampling cycle; and a control unit which calculates a temperature of the display panel based on the output value of the temperature sensor, wherein the control unit calculates the temperature of the display panel based on a current output value of the temperature sensor and an output value of the temperature sensor received in a preceding cycle prior to the receiving of the current output value;

the control unit receives a control command value which is control information for the heat source device; and the control unit calculates the temperature of the display panel based on the difference between a value based on the output value of the temperature sensor and a value based on the control command value.

5. The display device according to claim 4, wherein the control command value is control information for controlling a light source of a backlight unit.

6. The display device according to the claim 4, wherein the value based on the control command value is calculated based on a current control command value and a control command value received prior to the receiving of the current control command value.

* * * * *